United States Patent [19]

Nakagawa et al.

[11] Patent Number: 4,690,638
[45] Date of Patent: Sep. 1, 1987

[54] WATER COOLED SCRAP PREHEATING BUCKET

[75] Inventors: Fumio Nakagawa, Onoda; Kazuyoshi Nakamura; Hitoshi Shibao, both of Ube; Hiroshi Yoshimura, Onoda; Koichi Taki, Onoda; Makoto Inoue, Onoda; Eiji Hayashi, Onoda; Fusao Dejima, Onoda; Yuritoshi Kohara, Onoda, all of Japan

[73] Assignee: Yamaguchikyoei Industry Co. Ltd., Japan

[21] Appl. No.: 892,012

[22] Filed: Aug. 1, 1986

[30] Foreign Application Priority Data

| Aug. 6, 1985 | [JP] | Japan | 60-173672 |
| Aug. 6, 1985 | [JP] | Japan | 60-173673 |
| Aug. 6, 1985 | [JP] | Japan | 60-121402[U] |
| Aug. 6, 1985 | [JP] | Japan | 60-121403[U] |
| Nov. 27, 1985 | [JP] | Japan | 60-268044 |
| Jan. 17, 1986 | [JP] | Japan | 61-5706[U] |

[51] Int. Cl.[4] .......................................... F27D 15/02
[52] U.S. Cl. ...................................... 432/81; 266/901; 432/162; 432/241
[58] Field of Search ............... 432/81, 14, 239, 254.1, 432/254.2, 9, 241, 162; 266/270, 275, 901

[56] References Cited

U.S. PATENT DOCUMENTS

| 3,514,279 | 5/1970 | Jensen et al. | 266/901 X |
| 3,852,028 | 12/1974 | Reinbolr et al. | 266/901 X |
| 4,262,825 | 4/1981 | Jacobson et al. | 432/241 X |
| 4,563,958 | 1/1986 | Minarik et al. | 266/901 X |

Primary Examiner—Edward G. Favors
Attorney, Agent, or Firm—Sughrue, Mion, Zinn, Macpeak, and Seas

[57] ABSTRACT

A bucket cooled by circulating water and scrap preheating apparatus incorporating the bucket are disclosed. The bucket comprises a bucket-shaped container which contains scrap to be preheated and through which an exhaust gas from an electric furnace is passed to preheat the scrap contained therein, a cooling water passageway which surrounds the periphery of said container, and water supply and exhaust ports which are connected to said cooling water passageway, cooling water being supplied to and exhausted from the bucket during preheating of the scrap contained therein.

12 Claims, 6 Drawing Figures

WATER COOLED SCRAP PREHEATING BUCKET

BACKGROUND OF THE INVENTION

The present invention relates to a bucket cooled by circulating water and a scrap preheating apparatus incorporating the bucket. In particular, it relates to a scrap preheating apparatus which utilizes as its heat source the exhaust gas from an electric furnace.

Preheating of scrap has recently come to be practiced in the manufacture of steel by electric furnaces since it markedly reduces the unit electric power and also increases productivity. Several systems for preheating scrap have been actually installed in electric furnaces and have proved to be efficient.

Exhaust gas from an electric furnace is utilized to preheat scrap according to two different methods. In one method, the exhaust gas is combusted before being used for preheating. In the other method, the exhaust gas is used for preheating scrap without being combusted or otherwise treated beforehand.

There are two types of apparatus for preheating scrap. In one type, a bucket containing scrap is placed in the preheating apparatus and both the scrap and the bucket are heated. The preheated scrap is then removed from the apparatus together with the bucket. In the other type, the bucket itself is utilized as a preheating apparatus. Namely, an exhaust gas is passed from the top to the bottom of the bucket to preheat the scrap.

Up to the present time, it has been most common to preheat scrap by combusting exhaust gas from an electric furnace and then introducing the combusted gas into a preheating apparatus containing a bucket, thereby preheating not only the scrap contained in the bucket but also the bucket itself. This method is called the indirect preheating method.

However, the indirect method has poor heat efficiency, and equipment costs are high since it requires a combustion apparatus as well as a preheating apparatus. Thus, the indirect preheating method is not economically attractive.

As opposed to the indirect method, there are direct preheating methods in which exhaust gas is directly supplied from an electric furnace to a preheating bucket without being first combusted, and the bucket itself is used as a preheating apparatus. Direct methods have high heat efficiency and do not require a combustion apparatus or an additional preheating apparatus. However, as the temperature of exhaust gas is over 500° C., the exhaust gas sometimes produces serious thermal deformation of the bucket containing the scrap. Thus, it is necessary in a direct method to provide some means for protecting the bucket from excess heat.

In order to avoid therxal deformation of a bucket used in a direct heating method, Japanese Patent Publication No. 1751/1982 suggests the provision of a water jacket around the bucket. A high-temperature exhaust gas from an electric furnace is introduced from the top of the bucket, and the wall of the bucket is cooled with water.

However, according to the system disclosed therein, as the cooling water remains stationary within the water jacket, the cooling effect thereof is not sufficient and it is impossible to continue preheating the scrap until a desirably high temperature (above 500° C.) is attained. Namely, when preheating is continued until such a high temperature is attained, the cooling water in the jacket vaporizes and an extremely high pressure develops within the jacket, and there is the possibility of steam or water leaking from the jacket due to the high pressure. Furthermore, there is the danger of water leaking or overflowing from the jacket during transport of the bucket, and thermal deformation of the bucket is inevitable. A bucket of this type thus has drawbacks with respect to safety.

Furthermore, it is sometimes necessary to keep the preheated scrap within a bucket before charging it into an electric furnace because of some operational troubles. While keeping such preheated scrap within the bucket, water contained in a jacket provided around the bucket evaporates due to the heat of the scrap and the pressure within the jacket increases. A burst of steam out of the jacket might occur through an exhaust port.

In addition, when a cylindrical bucket measuring 4 m in diameter and 4 m in height and weighing 12 tons is carried by means of a crane and is placed at a given site, it is impossible to position the bucket with an accuracy of 20 mm in each direction. Thus, it has been thought impractical to employ a water-circulating cooling system for a bucket because the difficulty in positioning a bucket would make it extremely difficult to reliably connect the bucket to a source of cooling water.

SUMMARY OF THE INVENTION

An object of the present invention is to provide an apparatus for preheating scrap which is free from the above-described disadvantages of prior art apparatuses.

Another object of the present invention is to provide an apparatus for preheating scrap which incorporates a bucket comprising a water-circulating and water-cooling system which is free from leakage or overflow of water, not only during preheating but also during transport of the scrap.

A further object of the present invention is to provide a system by means of which continuous cooling with water is carried out during preheating of the scrap contained in a bucket, and after completion of the preheating the level of the cooling water within the cooling means is decreased, ensuring safety of operation during transport of the bucket and during charging of the scrap into an electric furnace.

A still further object is to provide a bucket which can attain the above-mentioned purposes without being subject to thermal deformation even when the scrap is heated to over 500° C.

A scrap preheating apparatus according to the present invention is characterized by the following features:

(1) a bucket serves as an apparatus for preheating scrap;

(2) a high temperature exhaust gas from an electric furnace is used as a source of preheating energy, the gas preferably being passed directly through the bucket;

(3) a passageway for cooling water is provided surrounding the outer periphery of a bucket and cooling water is forced to circulate therethrough during at least part of the period of preheating;

(4) a water supply and waste system is provided which is free from water leakage, and connecting and disconnecting it from a bucket is made easy;

(5) after completion of preheating, the level of cooling water contained in the cooling system is decreased; and (6) an auxiliary tank is provided in case of emergency.

DETAILED DESCRIPTION OF THE PREFERRED EMBODIMENTS

Figure 1:
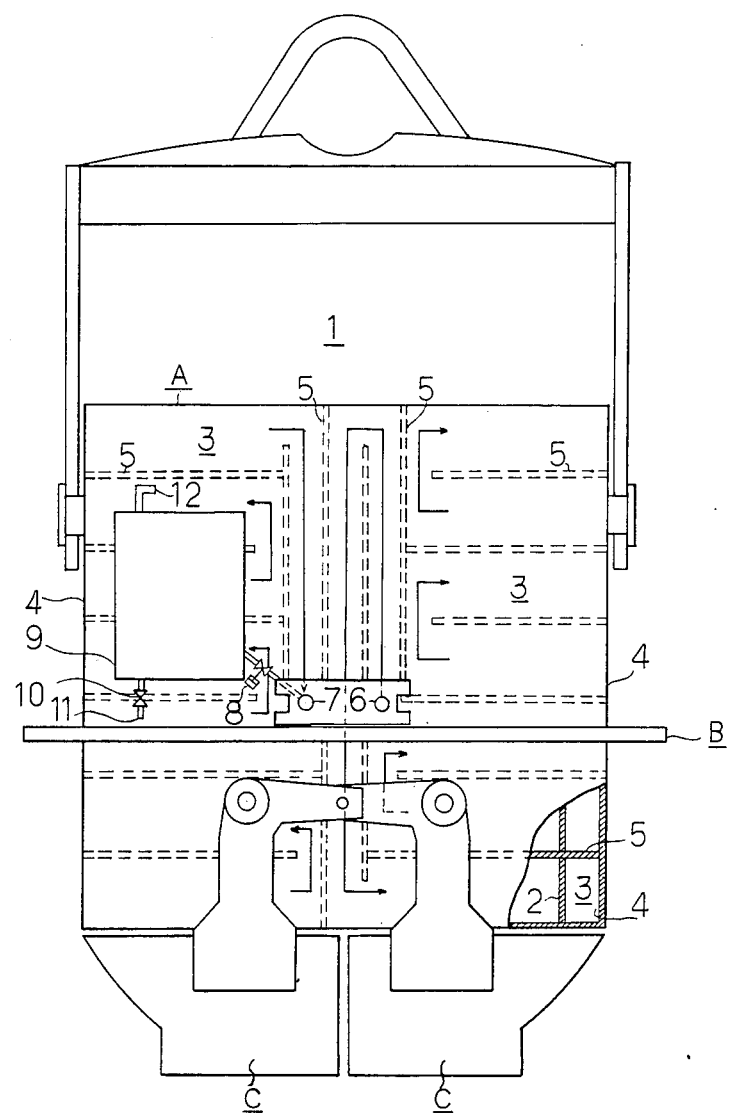
FIG. 1 is a schematic side view of a bucket cooled by circulating water for use in preheating scrap.

FIG. 1 is a schematic side view of a bucket cooled by circulating water of the present invention (hereinafter simply referred to as a bucket). The illustrated bucket is of the clamshell type.

The bucket 1 is of double-walled construction, having an inner wall 2, an outer wall 4, and a passageway 3 for a cooling water which is formed between the inner wall 2 and the outer wall 4 around substantially the entire periphery of the inner wall 2. The passageway 3 is divided into a plurality of interconnected horizontal levels by means of horizontal and vertical partition walls 5. The two ends of the passageway 3 communicate with a water intake port 6 and a water outflow port 7, respectively.

The water intake port 6 is provided roughly midway up the height of the bucket 1. As shown by arrows in the drawing, cooling water circulates through the passageway 3, first passing to the upper portion of the bucket 1 and then to the bottom portion thereof. It then enters the bottom level of the passageway 3, circulates around the periphery of the inner wall 2, and then enters the second level. After circulating around the second level, it passes to the third level, and so forth, flowing through each level of the passageway 3 until it reaches the uppermost portion of the bucket 1. Thus, after cooling the entirety of the bucket 1, the cooling water goes down through a vertical passageway within the bucket 1 to reach the outflow port 7.

Alternatively, the cooling water may pass through the bucket 1 in the opposite direction.

An auxiliary tank 9 is provided outside the bucket 1. Both the tank 9 and the outflow port 7 are connected to the passageway 3 via a three-way cock 8. Thus, by turning the cock 8, cooling water can be made to flow from the passageway 3 either into the tank 9 or through the outflow port 7. An outflow hose 11 having a valve 10 extends from the tank 9. An exhaust pipe 12 for water vapor extends upwards from the tank 9.

Other examples of the passageway 3 for a cooling water are: (1) a cooling piping helically arranged around substantially all of the outer wall of the bucket 1; (2) a cooling piping arranged in a zigzag in the vertical direction; (3) a water-circulating box provided along the periphery of the bucket 1; and (4) a combination of any two or more of the above-mentioned systems. These passageways may also be employed in the present invention, so long as they are provided with one or more water intake and outflow ports.

Preferably, the intake port 6 and outflow port 7 are adjacent to each other and at the same height.

A method of preheating scrap using the above-illustrated bucket will now be described.

A bucket 1 containing scrap is covered by a hood having an intake port for exhaust gas from an electric furnace. The covered bucket is placed on a stand (not shown) with a flange B of the bucket 1 engaging the edge of the stand. An exhaust gas outflow port is provided on the stand. The bottom C of the bucket 1 is equipped with a clamshell-type opening and closing mechanism. The structure of the bottom C of the bucket 1 is such that even when it is closed, exhaust gas can freely pass therethrough.

The temperature of the exhaust gas depends on whether it is supplied directly from the furnace or whether it is first combusted after being exhausted from the furnace. Sometimes the temperature reaches 1300° C. In this case, a portion of the scrap may be heated to a temperature of 1000° C., and the wall of the bucket may reach such a high temperature in a very localized area.

In order to cool the bucket uniformly, cooling water which is supplied through the intake port 6 passes to the bottom of the bucket and then upward to the top of the bucket, or else it is first passed to the top of the bucket and then turned downwards through a multi-level passageway to reach the bottom thereof. The inner wall is cooled by a forced flow of cooling water so that a rise in temperature is suppressed and the thermal deformation of the walls of the bucket is avoided.

Sea water and the like may also be used as the cooling water.

In a preferred embodiment, cooling water is passed from the top to the bottom at a rate of 200–1000 l/min.

Although all of the inner wall is cooled in another preferred embodiment, the present invention is not limited to that embodiment, since scrap is sometimes locally preheated within the bucket, in which case the entire inner wall does not require cooling.

After completion of the preheating of scrap, the intake port is closed and then the outflow port is closed with the level of the cooling water which is maintained within the passageway being lowered by about one level of the multi-level passageway. Thus, it is important to keep the water within the bucket at a lower level by controlling a water supply and waste system which is described hereinafter.

The intake and outflow ports are separated from the water supply and waste system and then the bucket is lifted by means of a crane with cooling water still within the passageway after removing the hood from the top of the bucket. The bucket is carried to the top of an electric furnace, and the preheated scrap is charged into the furnace. It is very important, according to the present invention, that the inner wall of the bucket always be cooled by a forced flow of cooling water during preheating.

After completion of preheating of scrap, sometimes an electric furnace is not yet ready for the charging of the scrap because it has taken a long time to repair the furnace and the bucket containing the preheated scrap has to be maintained in a heated state. At that time, according to the apparatus of the present invention, the cock 8 is opened to an auxiliary tank 9 and the valve 10 is closed. Therefore, even if the temperature of the water contained in the bucket 1 increases and water evaporates, and part of the resulting steam flows out of the exit port 7, the steam which flows out is exhausted into the auxiliary tank 9. Part of the steam is released into the atmosphere via the exhaust port 12, and the remainder thereof condenses and remains in the auxiliary tank 9. The water collected in the auxiliary tank 9 is removed through the exhaust hose 11 by opening valve 10 after scrap has been charged into a furnace and the bucket 1 has been conveyed to a place remote from the furnace.

Figure 2:
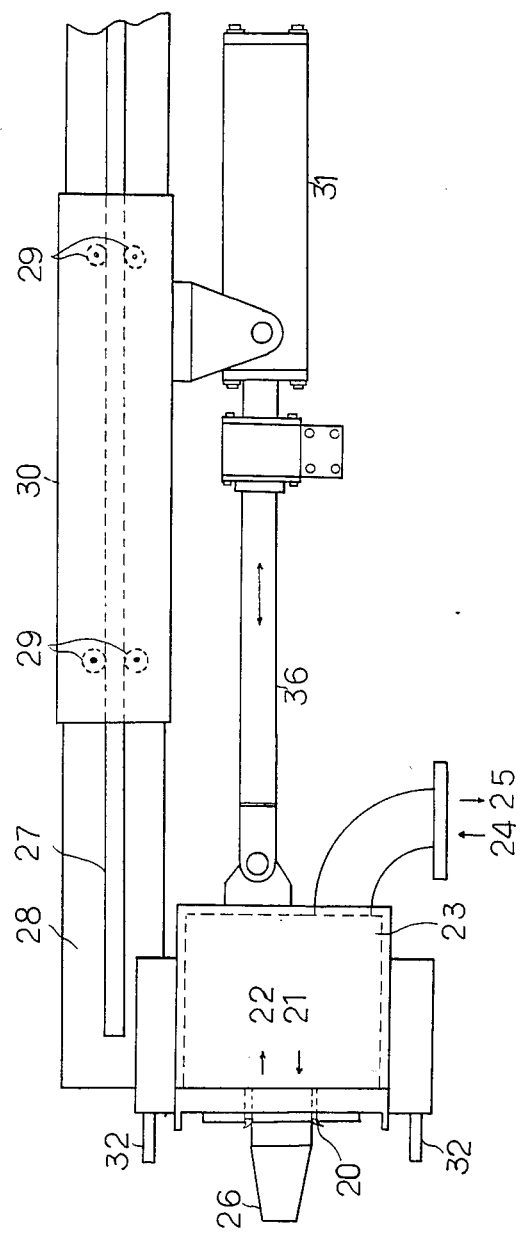
FIG. 2 is a schematic sectional view of a connecting and disconnecting mechanism for a water supply and exhaust system for the water-cooled bucket of FIG. 1.
Figure 3:
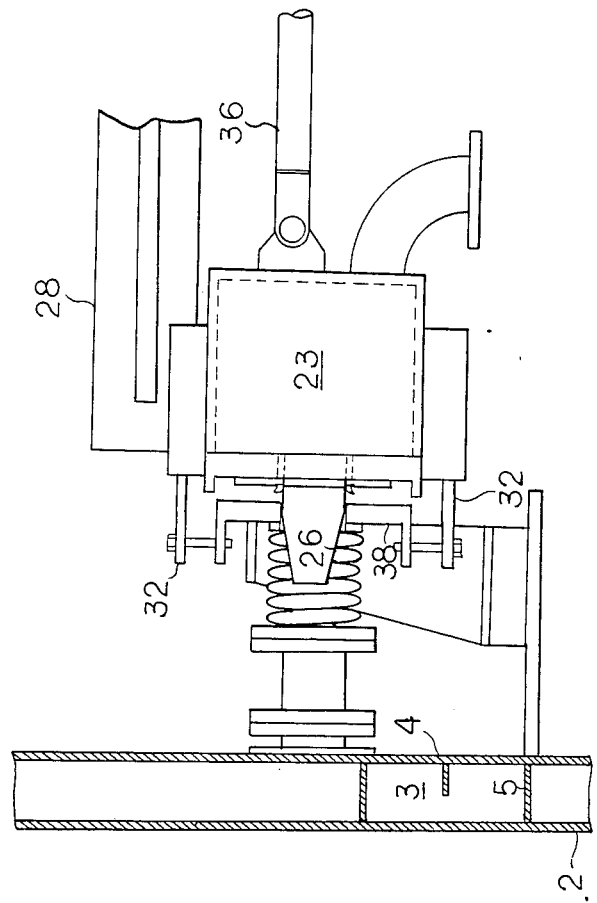
FIG. 3 is a side view of the connecting mechanism when the water supply and exhaust system is connected to the bucket of FIG. 1.

FIG. 2 is a side view of a connecting mechanism for a water supply and exhaust system for use with a water-cooled bucket of the present invention, and FIG. 3 is a side view of the connecting mechanism when connected to a water-cooled bucket. In the drawing, element number 23 is a connecting and disconnecting unit through which cooling water is supplied to the bucket. On its front side (the left side in the figure), the unit 23 has a water supply port 21 and a water exhaust port 22 which correspond to the water intake port 6 and the water outflow port 7, respectively, of the bucket. In its back side, it has a water supply port 24 which communicates with water supply port 21 and a water exhaust port 25 which communicates with water exhaust port 22 on the front side. As shown in FIG. 3, the ports 24 and 25 have pipes mounted thereon. These pipes are connected to flexible hoses which will be described further on.

A packing 20 is provided on the front side of the unit 23 around water supply port 21 and water exhaust port 22. The packing 20 must be highly flexible and have good sealing properties. Furthermore, since the unit 23 must be connected and disconnected numerous times, the packing 20 must be extremely durable. A lip packing is particularly suitable as the packing 20.

At its four corners, the unit 23 has pneumatic clamps 32 each comprising a cylinder, a ram, and a removable contact arm (see FIG. 3).

The unit 23 also has two generally cone-shaped positioning guides 26 secured to its front surface which are used for aligning ports 21 and 22 of the unit 23 with the ports 6 and 7 on the bucket.

The unit 23 is supported by a sliding guide 28 which in turn is slidably supported by a stationary guide support 30. The guide 28 is a cylindrical member having two longitudinally-extending ledge-shaped protrusions 27 formed on opposite sides. Each of the protrusions 27 is slidably supported from above and below by four rollers 29 which are rotatably mounted on the guide support 30. The guide support 30 is rigidly secured to the periphery of a power cylinder 31 which supports the weight of all the elements illustrated in FIG. 2.

The power cylinder 31 is supported by an unillustrated member. The cylinder 31 has a ram 36 which is connected to the back side of the unit 23, and when the cylinder 31 is operated, the unit 23 and the sliding guide 28 are moved back and forth by the ram parallel to the longitudinal axis thereof, as shown by the double-headed arrow.

The connection between a bucket and the unit 23 is illustrated in FIG. 3. As shown in the figure, the water intake port 6 and the water outlow port 7 are both formed in a generally rectangular flange 38 which is secured to two rubber hoses. The opposite ends of the rubber hoses are secured to two rigid connecting pipes which are mounted on the side of the bucket and communicate with the cooling water passageway. Ports 21 and 22 communicate with the cooling passageway in the bucket via the rubber hoses and the connecting pipes. The flange has two guide notches formed in its end surfaces which correspond to the two positioning guides 26. When the unit 23 is being connected to the flange, the guides 26 engage with the corresponding notches in the flange and align ports 21 and 22 of the unit 23 with the corresponding ports 6 and 7 in the flange. The weight of the flange is carried by a base which is supported by a ledge which is secured to the bucket.

Reliable contact between the flange and the unit 23 is achieved by means of the pneumatic clamps 32. When the pneumatic cylinders of the clamps 32 are actuated, the rams are drawn inwards, and the contact arms exert a force on the 4 corners of the flange in the direction of the unit 23 so that the flange is pulled towards the packing 20 and pressed firmly against it. After the flange is in contact with the packing 20, the clamps 32 continue to exert a compressive force on the two so that cooling water is unable to leak from the unit 23 while the unit 23 is connected with the flange.

When the bucket 1 is carried by means of a crane to a predetermined place in a preheating stand, the unit 23 is moved together with the sliding guide 28 by the cylinder 31 so as to align each guide 26 with a corresponding notch (not shown) on the above-mentioned flange of the bucket 1. With the help of the guide 26, positioning can be carried out accurately.

The error in positioning of the supply port 21 and the exhaust port 22 with respect to displacement and twisting can be limited to less than 20 mm due to the synergistic effect of the two guides 26, the sliding guide 28, the cylinder 31, the special packing 20, and the flexibility of a rubber hose (not shown) on the bucket side.

After connection is effected, leakage of cooling water is completely prevented. Wearing of the packing 20 is also prevented successfully.

Thus, according to the present invention, the time efficiency of the bucket has been improved by 20%.

Figure 4:
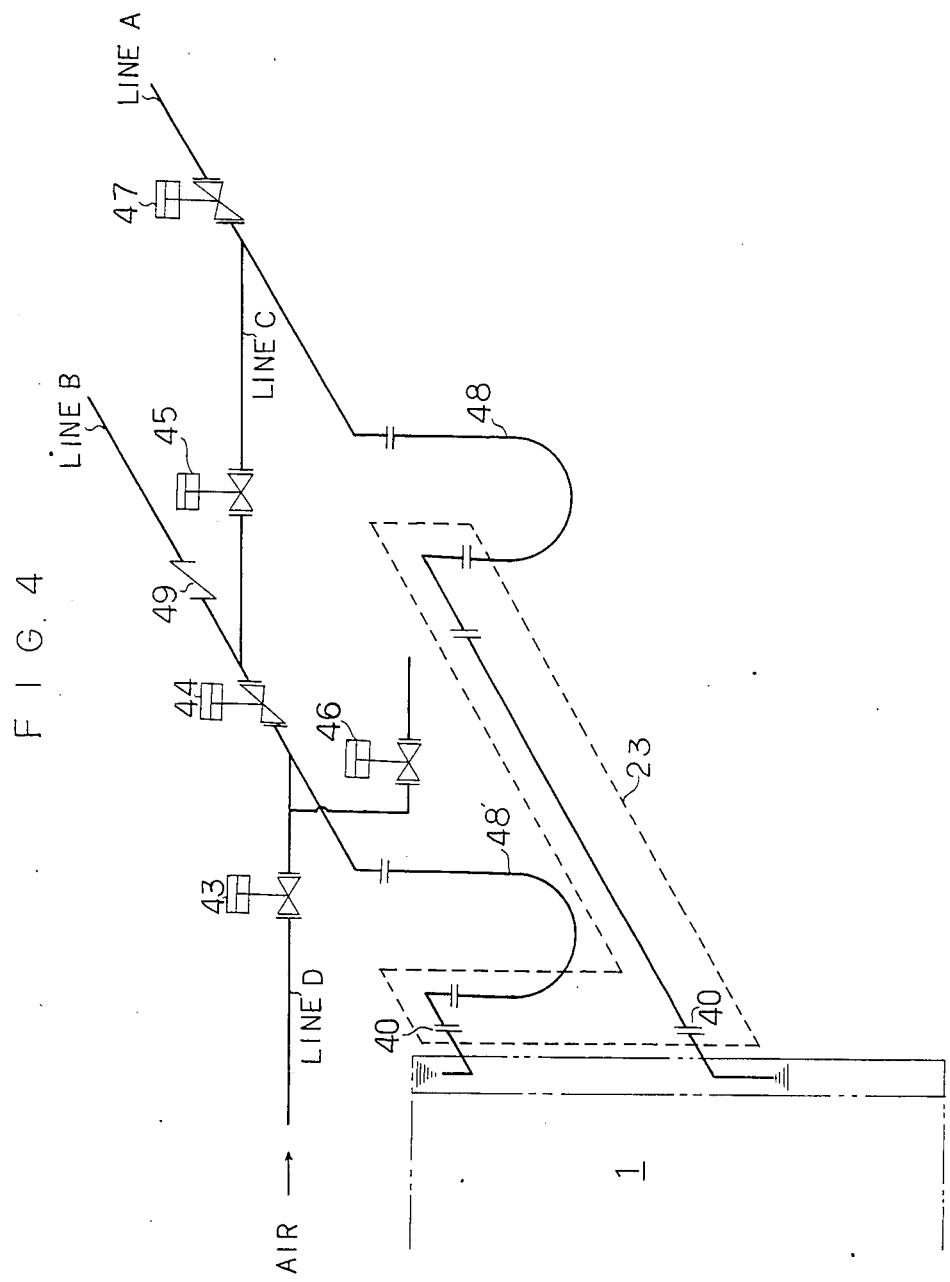
FIG. 4 is a view showing in detail a water supply and waste system to be applied to the water-cooled bucket of the present invention.

FIG. 4 schematically illustrates a water supply and exhaust system for use in a water-cooled bucket of the present invention. In the drawing, Lines A, B, and C indicate lines for cooling water and Line D is a line for air. When water cooling is to be carried out, Lines A and B are connected to the bucket 1 via the connecting and disconnecting unit 23, which is connected to the flange 38 of the bucket. Valves 43, 44, 45, and 46 are closed, and valve 47 on Line A is opened. Water is supplied through hose 48 and connecting flange 40 to the bucket 1 first via the bottom thereof and the cooling water passageway provided throughout the side wall of the bucket 1. The water is then discharged from the bucket through flange 40, valve 44, and check valve 49. While the scrap in the bucket 1 is being preheated, the cooling water is forced to circulate through the cooling water passageway so as to cool the bucket 1.

When the preheating of scrap is completed, it is necessary to prevent leakage of water from the water passageway while the bucket is being carried to an electric furnace and the scrap is charged into the furnace. It is therefore necessary to remove part of the water contained in the bucket, i.e., to lower the water level. Valves 44 and 47 are closed, valves 43 and 45 are opened, and compressed air is supplied through Line D. The compressed air forces water out of the bucket 1 through connecting flange 40, Line C, and check valve 49. In order to prevent reverse flow of water from the bucket during conveying and charging due to an imbalance of water pressure, valve 43 is closed, valve 44 is opened, and valve 46 is opened, so that the air pressure in this line is equal to atmospheric pressure. Then, valve 46 is closed, valve 45 is opened, the unit 23 is disconnected from the bucket 1, and the bucket 1 is conveyed to an electric furnace by means of a crane.

The hoses 48, 48' which constitute part of Lines A and B are preferably long enough to hang down loosely so as to prevent stresses from developing in the lines. They connect to the previously-described pipes on the back side of the unit 23.

There is no restriction on the structure of the valves used in the present invention, but ball valves of the cylinder actuation type are particularly suitable.

Figure 5:
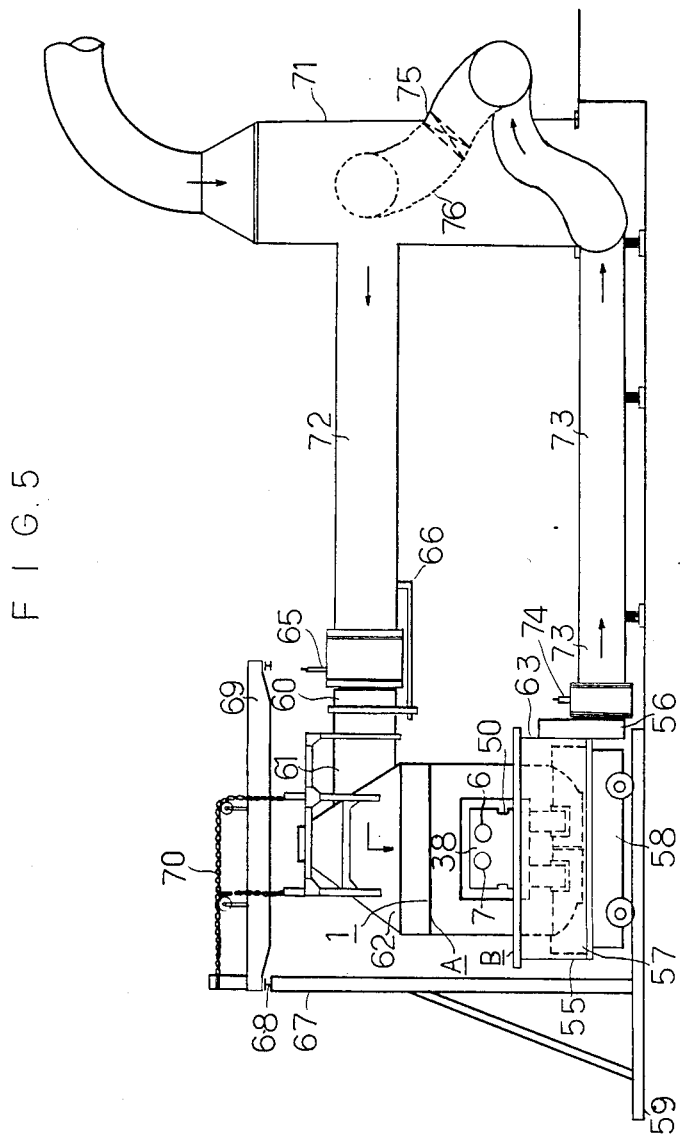
FIG. 5 is a schematic sectional side view of the scrap preheating apparatus of the present invention.

FIG. 5 is a schematic side view of a scrap preheating apparatus utilizing a water-cooled bucket of the present invention like the one illustrated in FIG. 1. A water supply port 6 and water exhaust port 7 are provided on a flange 38 which has guide holes 50 formed on its right and left sides. A bucket 1 is connected through a rubber hose to a water source (not shown) via a connecting and disconnecting unit as shown in FIG. 3. A cooling water passageway which connects the water supply port 6 to the water exhaust port 7 extends from the top to the bottom of the bucket 1. For simplicity, the water supply and exhaust system of FIG. 4 and the connecting and disconnecting mechanism of FIG. 2 and 3 have not been illustrated.

The bucket 1 is supported by a stand 55 which comprises a bucket-supporting truck 58 having a gas exhaust port 56 and a preheating tank 57. The truck 58 rides on rails 59 and can move parallel to a duct 73 as shown by the thin arrows at the lower left side of the truck 58. After scrap is charged into the bucket 1 in another place, the bucket 1 is conveyed on the rails by the truck 58 to the illustrated location for scrap preheating.

An exhaust gas supply port 61 which is connected to a sliding conduit 60 is fixed to a hood 62. The outer wall of the hood 62 is completely covered by a cast refractory to prevent heat radiation from the exhaust gas.

The upper portion of the truck 58 has a sealing portion provided around its periphery which forms an airtight seal between the preheating tank 57 and the flange B of the bucket 1 and prevents leakage of exhaust gas. The hood 62 is placed on top of the bucket 1.

A first damper 65 is connected to a sliding conduit 60 by a sliding guide 66 so as to prevent leakage of hot exhaust gas.

Two rails 68 which extend perpendicularly with respect to the lower rails 59 are supported by posts 67 which are secured to the floor. A girder 69 is supported by the rails 68 in a manner so as to be able to move parallel thereto.

The hood 62 is hung from the girder 69 by a chain 70 or other means which can raise and lower the hood 62. When the hood 62 is lifted from the bucket 1 by the chain 70, it can be transported to another auxiliary preheating tank by the transverse movement of the girder 69 along rails 68.

A first horizontal duct 72 has one end directly connected to a main duct 71 and the other end connected to the sliding conduit 60 via the first damper 65. The first horizontal duct 72 is completely covered by a cast refractory lining to prevent radiation of heat from the exhaust gas passing through the duct.

Similarly, the exhaust port 56 of the bucket truck 58 is connected to the outer end of a second exhaust duct 73, which has a second damper 74 provided thereon.

Thus, hot exhaust gas can circulate through the bucket and the ducts 72 and 73 as shown by the thick arrows in FIG. 5.

A third duct 76 has one end connected to the main duct 71, while its other end converges with the second duct 73. The flow of exhaust gas through the third duct 76 is controlled by a third damper 75 provided therein.

When preheating of scrap is started using the scrap preheating apparatus shown in the drawings, the first and second dampers 65 and 74 are opened while the third damper 75 is closed. Hot exhaust gas at 600° C. or higher from an unillustrated electric furnace is then supplied to the main duct 71. As the first damper 65 is open, the hot exhaust gas can pass through the first horizontal duct 72, and then it passes through the supply port 61 and hood 62 to preheat the scrap contained in the bucket 1 to a temperature of 500° C. or higher. It may be advisable to raise the preheating temperature by combining coke, chips of rubber tires, and the like to the scrap in the bucket, these additives then being combusted in the bucket 1.

While preheating is carried out, cooling water is circulated through the bucket 1 at a rate of 200–1,000 1/min to cool the inner wall of the bucket. As a result, the bucket 1 is free from thermal deformation which has been a problem with conventional preheating apparatus.

After passing through the bucket 1, the exhaust gas is discharged from the exhaust port 56 to a dust collector (not shown) via the second damper 74 and the second exhaust duct 73. Until the next preheating of scrap is started, the first and second dampers 65 and 74 are then closed, the third damper 75 is opened, and the exhaust gas passes through the third duct 76 directly into a dust collector (not shown).

In the actual use of the present invention, ducts 71, 72, 73, and 76 are completely covered by a cast refractory outer lining, and the leakage of exhaust gas is made as small as possible by firmly connecting the first damper 65 to the hood 62, connecting the hood 62 to the bucket 1, and connecting the bucket 1 to the preheating tank 57. In addition, due to the synergistic effect derived from employxent of a water-circulating bucket, hot exhaust gas directly passed from an electric furnace is used to preheat scrap so as to ensure a scrap pretreatment temperature of 500° C. or higher.

Figure 6:
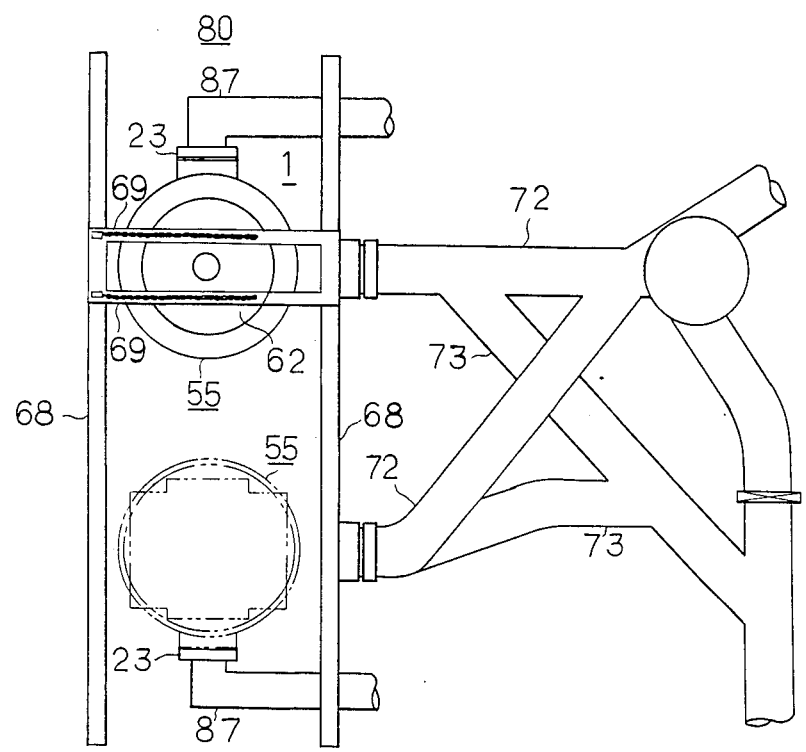
FIG. 6 is a schematic plan view of the scrap preheating apparatus of the present invention.

FIG. 6 is a schematic plan view of a scrap preheating apparatus 80 of the present invention.

In the drawing, two preheating stands 55 are provided. A water-cooled bucket 1 is alternately placed on each stand 55. Exhaust gas from an electric furnace (not shown) flows through a supply duct 72, a hood 62, and an exhaust duct 73.

In the illustrated embodiment, a water-cooled bucket according to the present invention sits on the upper of the two stands 55. The water supply port and exhaust port of the water-cooled bucket are connected to a water supply and exhaust system 87 via a connecting and disconnecting unit 23. As already explained, hot exhaust gas is supplied to the bucket by opening unillustrated dampers. The hot exhaust gas preheats the scrap while cooling water is circulated through the cooling water passageway so as to cool the bucket during preheating of scrap.

After completion of preheating of scrap, the hood 62 for supplying exhaust gas to the bucket is removed, the circulation of cooling water is stopped, and as already mentioned, part of the water contained in the cooling water passageway of the bucket is discharged from the bucket. The water supply and exhaust system 87 is removed, and then the stand 55 which sits on the truck is pulled away. The bucket is lifted by a crane and carried to a predetermined site above the electric furnace.

Another bucket having the same structure is then placed on the other stand 55 (the lower one in FIG. 6) and the same operation is repeated. The hood 62, which is supported by the girder 69 which can slide along the rails 68, is transported to a position above the bucket. When the hood 62 is placed on the bucket, the supply of exhaust hot gas is initiated by controlling the dampers.

The present invention will be further described in conjunction with a working example of the present invention.

EXAMPLE

In this example, a bucket cooled by cirulating water of the type shown in FIG. 1 was used. The bucket was of the clamshell type and had a capacity of 44 m³. The bucket was filled with 35 tons of scrap and installed in an apparatus like the one shown in FIG. 5. Exhaust gas at an average rate of 2700 Nm³/min was supplied for 20 minutes at an inlet temperature of 1300° C. (max). The outlet temperature of the gas from the bucket was 300° C. The scrap was heated to 650° C.

Cooling water was supplied at a rate of 740 l/min to cool the bucket. As a result, the inner wall of the bucket reached a maximum temperature of only 40° C. and there was no thermal deformation.

The unit electric power, furnace operating time, and other operating characteristics are summarized in Table 1.

TABLE 1

| | | No preheating | Conventional | Present invention |
| --- | --- | --- | --- | --- |
| Bucket | Temp. (°C.) | Room temp. | (locally) 850 | 40 |
| | Deformation (mm) | — | max 200 | 0 |
| | Service life | Semi-permanent | 3 months | Over continuous 23 months |
| Preheating effect | Unit electric power (KWH/t) | 400 | 350 | 330 |
| | Furnace operating time (min/ch) | 87 | 82 | 77 |
| | Productivity (%) | 100 | 110 | 120 |
| Average preheating temp. (°C.) | | Room temp. | 320 | 650 |

As described hereinbefore, according to the present invention it is possible to preheat scrap to 500° C. or higher while markedly decreasing the unit electric power. Furthermore, the time required to achieve melting of the scrap is also decreased and productivity is increased, and the unit electric cost is markedly reduced.

What is claimed is:

1. A bucket cooled by circulating water for use in preheating scrap to be charged into an electric furnace, which comprises;
   a bucket-shaped container which contains scrap to be preheated and through which an exhaust gas from an electric furnace is passed to preheat the scrap contained therein;
   a cooling water passageway which surrounds the periphery of said container; and
   water supply and exhaust ports which are connected to said cooling water passageway, cooling water being supplied to and exhausted from the bucket during preheating of the scrap contained therein.

2. A bucket cooled by circulating water as recited in claim 1, which further comprises an auxiliary tank which is secured to the outer periphery of the container and which has an exhaust hole and an exhaust hose and is connected to said exhaust port via a three-way valve.

3. A bucket cooled by circulating water as recited in claim 1, which further comprises a connecting and disconnecting unit comprising a water supply port and a water exhaust port which incorporate a packing and which correspond to the water supply and exhaust ports, respectively, of the bucket, and a means of contacting said water-cooled bucket while supporting said connecting and disconnecting unit and aligning the ports of the bucket with the corresponding water supply and exhaust ports of the unit.

4. A bucket cooled by circulating water as recited in claim 3, in which said means of alignment comprises a cylinder which presses said connecting and disconnecting unit against the bucket with the water supply and exhaust ports being in alignment with those of the bucket while supporting the unit, a guide having rollers for sliding said unit connected to said cylinder, and a sliding guide having a protrusion which is engaged with said rollers.

5. A bucket cooled by circulating water as recited in claim 3, in which said unit comprises a clamp and guide.

6. A bucket cooled by circulating water as recited in claim 3, which further comprises a water supply and exhaust system comprising a cooling water supply line which is connected to said water supply port of said connecting and disconnecting unit via a flexible hose and which comprises valves, a cooling water exhaust line which is connected to said exhaust port of said connecting and disconnecting unit via a flexible hose, a connecting line for water which connects the water supply and exhaust lines and which comprises valves, and a pressurized air supply line which is provided upstream of a valve on said cooling water exhaust line.

7. A bucket cooled by circulating water as recited in claim 6, in which said valves are ball valves of the cylinder-actuation type.

8. A scrap preheating apparatus which comprises;
   a circulating water-cooled bucket comprised of a bucket-shaped container which contains scrap to be preheated and through which an exhaust gas from an electric furnace is passed to preheat the scrap contained therein, a cooling water passageway which surrounds the periphery of the container, and water supply and exhaust ports which are connected to said water passageway, cooling water being supplied to and exhausted from the bucket during preheating of the scrap contained therein;
   a hood which covers the top of said water-cooled bucket and which is connected to an exhaust gas source to supply the exhaust gas to the container; and a preheating stand which receives the water-cooled bucket thereon and comprises an exhaust port for the exhaust gas which has passed through the bucket.

9. A scrap preheating apparatus as recited in claim 8, in which said hood is supported by a girder which moves on rails.

10. A scrap preheating apparatus as recited in claim 8, in which two preheating stands are positioned in parallel with each other.

11. A scrap preheating apparatus as recited in claim 8, which further comprises a connecting and disconnecting unit comprising a water supply port and a water exhaust port which incorporate a packing and which correspond to the water supply and exhaust ports, respectively, of the bucket, and a means of contacting said water-cooled bucket while supporting said connecting and disconnecting unit and aligning the ports of the bucket with the corresponding water supply and exhaust ports of the unit.

12. A scrap preheating apparatus as recited in claim 11, which further comprises a water supply and exhaust system comprising a cooling water supply line which is connected to said water supply port of said connecting and disconnecting unit via a flexible hose and which comprises valves, a cooling water exhaust line which is connected to said exhaust port of said connecting and disconnecting unit via a flexible hose, a connecting line for water which connects the water supply and exhaust lines and which comprises valves, and a pressurized air supply line which is provided upstream of a valve on said cooling water exhaust line.

* * * * *